United States Patent
Buri et al.

(10) Patent No.: US 9,139,734 B2
(45) Date of Patent: Sep. 22, 2015

(54) PROCESS FOR THE PREPARATION OF SURFACE TREATED MINERAL FILLER PRODUCTS AND USES OF SAME

(75) Inventors: Matthias Buri, Rothrist (CH); Patrick A. C. Gane, Rothrist (CH); Samuel Rentsch, Aarburg (CH); René Burkhalter, Herzogenbuchsee (CH)

(73) Assignee: Omya International AG, Oftringen (CH)

(*) Notice: Subject to any disclaimer, the term of this patent is extended or adjusted under 35 U.S.C. 154(b) by 286 days.

(21) Appl. No.: 13/697,567

(22) PCT Filed: May 24, 2011

(86) PCT No.: PCT/EP2011/058409
§ 371 (c)(1),
(2), (4) Date: Feb. 7, 2013

(87) PCT Pub. No.: WO2011/147802
PCT Pub. Date: Dec. 1, 2011

(65) Prior Publication Data
US 2013/0197142 A1    Aug. 1, 2013

Related U.S. Application Data

(60) Provisional application No. 61/396,938, filed on Jun. 4, 2010.

(30) Foreign Application Priority Data

May 28, 2010 (EP) ..................... 10164408

(51) Int. Cl.
| | |
|---|---|
| C08K 9/00 | (2006.01) |
| C09C 1/02 | (2006.01) |
| C08K 13/02 | (2006.01) |
| C08K 9/04 | (2006.01) |
| C08K 3/26 | (2006.01) |
| C08K 5/07 | (2006.01) |

(52) U.S. Cl.
CPC . C09C 1/021 (2013.01); C08K 3/26 (2013.01); C08K 5/07 (2013.01); C08K 9/04 (2013.01); C08K 13/02 (2013.01); *C01P 2004/51* (2013.01); *C01P 2004/61* (2013.01); *C01P 2004/62* (2013.01); *C01P 2006/12* (2013.01); *C01P 2006/32* (2013.01); *C01P 2006/80* (2013.01); *C01P 2006/82* (2013.01); *C08K 2003/265* (2013.01)

(58) Field of Classification Search
CPC .......... C08K 3/26; C07C 68/04; C09C 1/021; C09C 3/10
USPC .................... 524/301, 425, 53; 106/491, 505; 523/200
See application file for complete search history.

(56) References Cited

U.S. PATENT DOCUMENTS

| | | | |
|---|---|---|---|
| 3,689,591 A * | 9/1972 | Lorentz et al. ............... | 525/206 |
| 4,407,986 A | 10/1983 | Nomura et al. | |
| 4,456,710 A | 6/1984 | Lüders et al. | |
| 4,520,073 A | 5/1985 | Randolph et al. | |
| 2002/0102404 A1 | 8/2002 | Nakai et al. | |
| 2004/0097616 A1 | 5/2004 | Hoppler et al. | |
| 2006/0014019 A1 | 1/2006 | Kuebelbeck et al. | |
| 2007/0197707 A1 | 8/2007 | Hoppler et al. | |
| 2008/0022901 A1 * | 1/2008 | Buri et al. ..................... | 106/471 |
| 2008/0206568 A1 | 8/2008 | Bardelli et al. | |
| 2009/0182081 A1 | 7/2009 | Bardelli et al. | |
| 2010/0041811 A1 | 2/2010 | Gane et al. | |
| 2010/0298472 A1 | 11/2010 | Bardelli | |
| 2011/0105670 A1 | 5/2011 | Gane et al. | |
| 2012/0264867 A1 | 10/2012 | Gane et al. | |
| 2014/0059999 A1 * | 3/2014 | Harris ....................... | 56/400.11 |

FOREIGN PATENT DOCUMENTS

| | | |
|---|---|---|
| CN | 1694928 A | 11/2005 |
| CN | 101111568 A | 1/2008 |
| CN | 101379147 A | 3/2009 |
| CN | 101501146 A | 8/2009 |
| CN | 101679680 A | 3/2010 |
| EP | 0108842 A1 | 11/1982 |
| EP | 1980588 A1 | 10/1988 |
| EP | 0325114 A2 | 7/1989 |
| EP | 2143688 A1 | 1/2010 |
| JP | 54162746 A | 12/1979 |
| JP | 2004292235 A | 10/2004 |
| RU | 2293094 C2 | 2/2007 |
| SU | 1198001 A1 | 12/1985 |
| SU | 1326590 A1 | 7/1987 |
| WO | 9202587 A1 | 2/1992 |
| WO | 9710309 A1 | 3/1997 |
| WO | 9961521 A1 | 12/1999 |
| WO | 0020336 A1 | 4/2000 |
| WO | 03082966 A1 | 10/2003 |
| WO | 2005075353 A1 | 8/2005 |
| WO | WO2008119390 | * 10/2008 |

OTHER PUBLICATIONS

International Search Report, dated Aug. 8, 2011 for PCT Application No. PCT/EP2011/058409.
Written Opinion of the International Searching Authority, dated Aug. 8, 2011 for PCT Application No. PCT/EP2011/058409.

* cited by examiner

*Primary Examiner* — Hannah Pak
(74) *Attorney, Agent, or Firm* — Amster, Rothstein & Ebenstein LLP

(57) ABSTRACT

The present invention relates to a process for preparing a surface treated mineral filler product, and to its preferred use in the field of plastic applications, and in particular polypropylene (PP)-or polyethylene (PE)-based breathable or extrusion coating film applications.

30 Claims, No Drawings

PROCESS FOR THE PREPARATION OF SURFACE TREATED MINERAL FILLER PRODUCTS AND USES OF SAME

CROSS-REFERENCE TO RELATED APPLICATIONS

This application is a U.S. national phase of PCT Application No. PCT/EP2011/058409, filed May 24, 2011, which claims priority to European Application No. 10164408.6, filed May 28, 2010 and U.S. Provisional Application No. 61/396,938 filed Jun. 4, 2010.

The present invention relates to a process for preparing a surface treated mineral filler product, and to its preferred use in the field of plastic applications, and in particular polypropylene (PP)- or polyethylene (PE)-based breathable or extrusion coating film applications.

Mineral fillers and especially calcium carbonate-containing mineral fillers are often used as particulate fillers in polymer products usually made of polyethylene (PE), polypropylene (PP), polyurethane (PU) and polyvinylchloride (PVC). However, calcium carbonate-containing mineral fillers are generally associated with the presence of volatiles evolving at temperatures reached during the application of such mineral fillers and/or in the processing of polymer products comprising such mineral fillers. Such volatiles may, for example, be:
- inherently associated with the mineral filler ("inherent volatiles"), and is especially associated water, and/or
- introduced during the treatment of the mineral filler ("added volatiles"), for example, to render the mineral filler more dispersible within a polymeric plastic medium, and/or
- generated by the reaction of inherent organic materials and/or added organic materials, with the mineral filler; such reactions may especially be induced or enhanced by temperatures reached during the introduction and/or processing of the polymeric material comprising the mineral filler, such as during the extrusion or compounding process; and/or
- generated by the degradation of inherent organic materials and/or added organic materials, forming $CO_2$, water and possibly low molecular mass fractions of these organic materials; such a degradation may especially be induced or enhanced by temperatures reached during the introduction and/or processing of the polymeric material comprising the mineral filler, such as during the extrusion or compounding process.

As a result of the presence of such volatiles, it may be difficult to prepare a polymer product free of voids leading to uneven surfaces and thus to a degradation of the quality of the final polymer product comprising such mineral filler. This is particularly a problem encountered in the preparation of PP- or PE-based breathable or extrusion coating films comprising a mineral filler and more particularly calcium carbonate-containing mineral fillers. Moreover, volatiles may lead to a reduction in the tensile and tear strength of such a film, and may degrade its visible aspects, in particular of its visible uniformity. Furthermore, volatiles can generate excessive foaming of the mineral filled polymer melt during a step of compounding, causing unwanted product build-up at the vacuum extraction and hence, forcing a reduced output rate.

In the art, several attempts have been made to improve the applicability of mineral fillers and especially calcium carbonate-containing mineral fillers, e.g. by treating such mineral fillers with higher aliphatic carboxylic acids, which in some cases may also be referred to as fatty acids, and aliphatic carboxylic acid salts. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 relates a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114, relating to non-sagging underseal compositions for motor vehicles based on polyvinyl chloride which has improved rheological and adhesion properties, Example 7 discloses a mixture of an ammonium salt of 12-hydroxystearic acid in combination with a fatty acid (in a weight ratio of 1:1) used to treat a mineral filler.

WO 03/082966 relates to a cross-linkable and/or cross-linked nanofiller composition which, in optional embodiments, may additionally include fillers that may or may not be coated with stearic acid, stearate, silane, siloxane and/or titanate. Such nanofiller compositions are used to increase barrier properties, strength and heat distortion temperatures, making them useful in medical, automotive, electrical, construction and food application.

US 2002/0102404 describes dispersible calcium carbonate particles coated on their surface with a combination of saturated and unsaturated aliphatic carboxylic acids and salts thereof along with an organic compound such as a phthalic ester, which are used in adhesive compositions to improve viscosity stability and adhesion properties.

Moreover, US 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated fatty acid, may be added to a pre-heated slurry of precipitated calcium carbonate, to ultimately produce a desired level of fatty acid coating on the calcium carbonate before proceeding with further process steps.

The abstract of JP54162746 discloses a composition comprising given relative amounts of rigid vinyl chloride resin, fatty acid treated-colloidal calcium carbonate, and barium stearate used in order to improve the heat stability of the vinyl chloride composition.

U.S. Pat. No. 4,520,073 describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula $CH_3(CH_2)_mCOOR$.

However, the prior art does rarely disclose processes for preparing treated mineral filler products which would solve the following multifaceted technical problems:

- to prepare a treated mineral filler product by using a surface treatment agent featuring a workable viscosity, that is to say a Brookfield viscosity of less than 1 000 mPa.s at 23° C.;
- to prepare a treated mineral filler product having a high volatile onset temperature above 220° C.
- to prepare a treated mineral filler product such that it is sufficiently hydrophobic for applications in plastics requiring dispersability of said mineral filler in the polymer medium, preferably such that said mineral filler is more hydrophobic than if treated with carboxylic acids and/or carboxylic acid salts having at least 10 carbon atoms treated at equal temperature;
- to prepare a treated mineral filler product having a low moisture pick up susceptibility such that it is lower than that of a mineral filler treated with carboxylic acids and/or carboxylic acid salts having at least 10 carbon atoms treated at equal temperature.
- to identify a surface treatment agent for the process that achieves the above regardless of whether or not the at least one mineral filler undergoes a salt exchange on contact with the surface treatment agent to create corresponding calcium salts on the surface of the treated mineral filler.

In this regard, one obvious means to increase the volatile onset temperature and to limit the corresponding quantity of total volatiles associated with the mineral filler is to avoid or limit the use of certain common filler treatment additives. However, often, as in the case when a mineral filler is applied in a plastic application, such additives are needed to ensure other functions.

For example, in the case of breathable film applications, additives are introduced to provide the mineral filler with a hydrophobic coating and to improve the dispersability of the mineral filler in the film precursor material as well as possibly to improve the processability of this film precursor material and/or properties of the final application products. An elimination of such additives would unacceptably compromise the resulting film quality.

In this regard, additional prior art, namely WO 99/61521 and WO 2005/075353, which suggest a reduction of only the inherent water and picked up humidity of the starting mineral filler, entirely missed the point of reducing the other volatiles besides water which contribute to the total volatiles.

Thus, there is still a need for providing a process which addresses the foregoing technical problems described and especially allows for improving the surface characteristics of a resulting treated mineral filler product.

Accordingly, it is an objective of the present invention to provide a process for preparing a treated mineral filler product having improved surface characteristics, and especially a high volatile onset temperature. A further objective is to provide a process for preparing a treated mineral filler product featuring a sufficient hydrophobicity for plastic applications. A still further objective is to provide a process for preparing a treated mineral filler product featuring a low moisture pick up susceptibility. Another objective of the present invention is to provide a process which can be carried out in a simple way. A further objective is that the process can be carried out under cost-efficient and mild conditions, i.e. by avoiding an intensive thermal treatment. Further objectives can be gathered from the following description of the invention.

The foregoing and other objectives are solved by the subject-matter as defined herein in claim 1.

Advantageous embodiments of the inventive process are defined in the corresponding sub-claims.

According to one aspect of the present application a process for preparing a treated mineral filler product providing a volatile onset temperature of at least 220° C. has been developed, wherein the process comprises the steps of:

(a) providing at least one calcium carbonate-containing mineral filler;
(b) providing at least one aliphatic aldehyde having between 6 and 14 carbon atoms;
(c) contacting said at least one mineral filler of step (a), in one or more steps, with the at least one aliphatic aldehyde of step (b) such that the added amount of said at least one aliphatic aldehyde corresponds to a theoretical total weight of between 0.25 mg/m² and 5 mg/m² on the surface of the treated mineral filler product; and
(d) forming a treatment layer comprising said at least one aliphatic aldehyde and/or reaction products of said at least one aliphatic aldehyde on the surface of said at least one mineral filler resulting in a treated mineral filler product.

The inventors surprisingly found that the foregoing process according to the present invention avoids the use of intensive thermal treatments and leads to a treated mineral filler product providing a high volatile onset temperature of at least 220° C., a very good hydrophobicity and low moisture pick up susceptibility. More precisely, the inventors found that the surface characteristics of a treated mineral filler product being obtained by said process can be improved by the addition of defined aliphatic aldehydes.

It should be understood that for the purposes of the present invention, the following terms have the following meanings:

The term "mineral filler" in the meaning of the present invention refers to substances of mineral origin added to materials such as paper, plastics, rubber, paints and adhesives, etc. to lower the consumption of more expensive materials such as binders, or to enhance technical properties of the products. The person skilled in the art very well knows the typical fillers used in the respective fields.

The term "saturated" in the meaning of the present invention means having an iodine number of less than 5 g $I_2$/100 g sample. This iodine number determination is well-known to the skilled man, and namely implements a determination of the iodine addition to a 100 g sample by back-titration of the surplus iodine with sodium thio sulfate.

The term "aliphatic aldehyde" in the meaning of the present invention refers to straight chain, branched chain, or alicyclic organic compounds composed of carbon and hydrogen. Said organic compound further contains an aldehyde function, preferably placed at the end of the carbon skeleton.

The term "aliphatic carboxylic acid" in the meaning of the present invention refers to straight chain, branched chain, or alicyclic organic compounds composed of carbon and hydrogen. Said organic compound further contains a carboxyl group placed at the end of the carbon skeleton.

The term "theoretical total weight" in the meaning of the present invention relates to the amount of treatment agent that would be present in the treatment layer if all of said treatment agent is completely deposited in the treatment layer.

The term "reaction products" in the meaning of the present invention refers to products typically obtained by contacting a mineral filler with a surface treatment agent. Said reaction products are preferably formed between the applied surface treatment agent and molecule located at the surface of the mineral filler.

The term "volatile onset temperature" in the meaning of the present application refers to a temperature at which volatiles—including volatiles introduced as a result of common mineral filler preparation steps including grinding, with or without grinding aid agents, benefaction, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500 +/−50 mg and scanning temperatures from 25 to 350° C. at a rate of 20° C./minute under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature".

A "molten" or "liquid" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning calorimetry, DSC, (DIN 51005: 1983-11).

The term "specific surface area" (in $m^2/g$) of the mineral filler in the meaning of the present invention is determined using the BET method, which is well known to the skilled man (ISO 9277:1995). The total surface area (in $m^2$) of the mineral filler is then obtained by multiplication of the specific surface area and the mass (in g) of the mineral filler prior to treatment.

The term "dry" mineral filler is understood to be a mineral filler having less than 0.3% by weight of water relative to the mineral filler weight. The % water is determined according to the Coulometric Karl Fischer measurement method, wherein the mineral filler is heated to 220° C., and the water content released as vapour and isolated using a stream of nitrogen gas (at 100 ml/min) is determined in a Coulometric Karl Fischer unit.

The term "molecules/$m^2$" or "number of molecules/$m^2$" in the meaning of the present invention is evaluated by determining the amount of the respective treatment agent (in mol) added to the at least one calcium carbonate-containing mineral filler and by calculating the theoretical number of molecules of said amount by using the Avogadro number [$N_A$] ($6.02214179 \times 10^{23}$/mol).

The term "moisture pick up susceptibility" in the meaning of the present invention refers to the amount of moisture absorbed on the surface of the mineral filler and is determined in mg moisture/g of the dry treated mineral filler product after exposure to an atmosphere of 50% of relative humidity for 48 hours at a temperature of 23° C.

The "hydrophobicity" of a mineral filler product is evaluated by determining the minimum methanol to water ratio in a methanol-water mixture needed for the settling of a majority of said mineral filler product, where said mineral filler product is deposited on the surface of said methanol-water mixture by passage through a house hold tea sieve.

As used herein and as generally defined in the art, the "$d_{50}$" value is determined based on measurements made by using a Sedigraph™ 5100 of Micromeritics Instrument Corporation and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

The Brookfield viscosity as used herein and as generally defined in the art is measured by using a DV III Ultra model Brookfield viscometer equipped with the disc spindle 3 at a rotation speed of 100 rpm and room temperature (23±1° C.) after stirring for one minute.

According to another aspect of the present invention, a treated mineral filler product is provided, wherein said mineral filler is obtainable by the inventive process for preparing a treated mineral filler product. According to another aspect, the present invention refers to the use of said treated mineral filler product in a process of mixing and/or extruding and/or compounding and/or blow moulding with plastic materials, in particular with plastic materials comprising polyolefins or thermoplastics such as polyethylenes (PE), polypropylenes (PP), polyurethanes (PU) and/or polyvinylchlorides (PVC). According to another aspect, the present invention refers to films, and in particular films selected from the group comprising stretched and/or oriented films, and preferably breathable films, or extrusion coating films, comprising the treated mineral filler product.

According to one preferred embodiment of the inventive process, the at least one calcium carbonate-containing mineral filler of step (a) is precipitated calcium carbonate (PCC), namely one or more of the aragonitic, vateritic and calcitic mineralogical crystal forms, and/or natural ground calcium carbonate (GCC), namely one or more of marble, limestone, or chalk, and/or dolomite and preferably is marble.

According to another preferred embodiment of the inventive process, the at least one aliphatic aldehyde of step (b) is selected from aliphatic aldehydes having 6 to 12 carbon atoms, preferably from aliphatic aldehydes having 6 to 9 carbon atoms and more preferably from aliphatic aldehydes having 8 or 9 carbon atoms.

According to yet another preferred embodiment of the inventive process, the at least one aliphatic aldehyde of step (b) is a saturated aliphatic aldehyde.

According to one preferred embodiment of the inventive process, the at least one aliphatic aldehyde of step (b) features an equivalent isolated viscosity of less than 500 mPa·s at 23° C. when measured in a DV III Ultra model Brookfield viscometer equipped with the disc spindle 3 at a rotation speed of 100 rpm and room temperature (23±1° C.).

According to another preferred embodiment of the inventive process, the at least one mineral filler provided in step (a)

has a median particle size diameter $d_{50}$ in the range between 0.3 µm and 10 µm, preferably between 0.5 µm and 5 µm, more preferably between 1 µm and 3 µm and most preferably between 1.5 µm and 1.8 µm and/or a specific surface area (BET) of between 1 m²/g and 10 m²/g and more preferably of between 3 m²/g and 8 m²/g as measured by the BET nitrogen method.

According to yet another preferred embodiment of the inventive process, the at least one mineral filler of step (a) has a moisture content of between 0.01 wt.-% and 1.0 wt.-%, preferably between 0.02 wt.-% and 0.9 wt.-% and more preferably between 0.04 wt.-% and 0.2 wt.-%, based on the dry weight of the at least one mineral filler provided in step (a).

According to one preferred embodiment of the inventive process, step (c) further comprises contacting said at least one mineral filler of step (a) with at least one saturated aliphatic carboxylic acid having 6 to 28 carbon atoms and/or at least one cation salt of one or more saturated aliphatic carboxylic acids having 6 to 28 carbon atoms and preferably said saturated aliphatic carboxylic acid is selected from the group consisting of stearic acid, behenic acid, palmitic acid, isostearic acid, montanic acid, capric acid, lauric acid, myristic acid and mixtures thereof and more preferably being a 2:1 to 1:2 mixture (by weight) of stearic acid and palmitic acid.

According to another preferred embodiment of the inventive process, step (c) further comprises contacting said at least one mineral filler of step (a) with at least one polysiloxane, preferably selected from polydimethylsiloxane.

According to yet another preferred embodiment of the inventive process, the treated mineral filler product obtained in step (d) features a volatile onset temperature of greater than or equal to 220° C., and preferably of between 240° C. and 280° C.

According to one preferred embodiment of the inventive process, the treated mineral filler product obtained in step (d) has a moisture content of between 0.01 wt.-% and 0.15 wt.-%, preferably between 0.02 wt.-% and 0.12 wt.-% and more preferably between 0.04 wt.-% and 0.08 wt.-% based on the dry weight of the at least one mineral filler of step (d).

According to another preferred embodiment of the inventive process, the treated mineral filler product obtained in step (d) features a moisture pick up susceptibility such that its total surface moisture level is below 1.0 mg/g, more preferably below 0.5 mg/g and most preferably below 0.4 mg/g of the dry treated mineral filler product after exposure to an atmosphere of 50% of relative humidity for 48 hours at a temperature of 23° C.

As set out above, the inventive process for preparing a treated mineral filler product having improved surface characteristics comprises the steps of (a), (b), (c) and (d). In the following, it is referred to further details of the present invention and especially the foregoing steps of the inventive process for preparing a treated mineral filler product.

Characterization of Step (a): Provision of a Calcium Carbonate-containing Mineral Filler According to step (a) of the process of the present invention, at least one calcium carbonate-containing mineral filler is provided.

A calcium carbonate-containing mineral filler in the meaning of the present invention refers to a calcium carbonate material selected from ground (or natural) calcium carbonate (GCC) or a precipitated, calcium carbonate (PCC) or a mixture of GCC and PCC, optionally co-ground.

GCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. Preferably, the GCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

In one preferred embodiment, the at least one calcium carbonate-containing mineral filler is marble.

The at least one calcium carbonate-containing mineral filler of step (a) is preferably in the form of a particulate material, and may have a particle size distribution as conventionally employed for the material(s) involved in the type of product to be produced. In general, the median particle size diameter $d_{50}$ value of the at least one calcium carbonate containing-mineral filler is in the range between 0.3 µm and 10 µm, preferably between 0.5 µm and 5 µm, more preferably between 1 µm and 3 µm and most preferably between 1.5 µm and 1.8 µm. A mineral filler $d_{98}$ of less than 25 microns, preferably of less than 10 microns may also be advantageous.

Additionally or alternatively, the at least one calcium carbonate-containing mineral filler provided in step (a) exhibits a BET specific surface area of from 1 m²/g to 10 m²/g and preferably of between 3 m²/g and 8 m²/g measured using nitrogen and the BET method according to ISO 9277.

In case the at least one calcium carbonate-containing mineral filler provided in step (a) in selected from GCC, the BET specific surface area is preferably of between 1 m²/g and 10 m²/g, more preferably of between 3 m²/g and 8 m²/g and most preferably of between 3.5 m²/g and 4.5 m²/g as measured by the BET nitrogen method.

For example, if a marble is used as the at least one calcium carbonate-containing mineral filler provided in step (a), the median particle size diameter $d_{50}$ value is preferably in the range between 1 µm and 3 µm, more preferably between 1.1 µm and 2.5 µm, even more preferably between 1.2 µm and 2 µm and most preferably between 1.5 µm and 1.8 µm. In this case, the marble preferably exhibits a BET specific surface area of from 3 m²/g to 6 m²/g, more preferably from 3.5 m²/g to 5.5 m²/g and most preferably from 3.5 m²/g to 4.5 m²/g, measured using nitrogen and the BET method according to ISO 9277.

By contrast, if a PCC is used as the at least one calcium carbonate-containing mineral filler provided in step (a), the BET specific surface area is preferably in the range of from 1 m²/g to 10 m²/g, more preferably of from 3 m²/g to 8 m²/g, even more preferably of from 6 m²/g to 7.5 m²/g and most preferably of from 6.5 m²/g to 7.5 m²/g, measured using nitrogen and the BET method according to ISO 9277.

The at least one calcium carbonate-containing mineral filler provided in step (a) is a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-dumper, a knife cutter, or other such equipment known to the skilled man.

In case a wet ground calcium carbonate-containing mineral filler is provided in step (a), the grinding step may be performed under conditions such that autogenous grinding takes place and/or by horizontal ball milling, and/or other such processes known to the skilled man. The wet processed ground calcium carbonate-containing mineral filler thus obtained may be washed and dewatered by well known processes, e.g. by flocculation, filtration or forced evaporation prior to drying. The subsequent step of drying may be carried out in a single step such as spray drying, or in at least two steps, e.g. by applying a first heating step to the mineral filler in order to reduce the associated moisture content to a level which is not greater than about 0.5 wt.-% based on the dry weight of the mineral filler, and applying a second heating step to the calcium carbonate in order to reduce the remaining moisture content to a level which is about 0.15 wt.-% or less, based on the dry weight of the mineral filler. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that such a mineral filler undergoes a beneficiation step (such as a flotation, bleaching or magnetic separation step) to remove impurities.

In one preferred embodiment, the at least one calcium carbonate-containing mineral filler provided in step (a) is a dry ground mineral filler. In another preferred embodiment, the at least one calcium carbonate-containing mineral filler provided in step (a) is a material being wet ground in a horizontal ball mill, and subsequently dried by using the well known process of spray drying. In still another preferred embodiment, the at least one calcium carbonate-containing mineral filler provided in step (a) is a material produced by dry grinding followed by aqueous low solids wet grinding at 10 wt.-% to 30 wt.-% solid material content, thermal or mechanical concentration to 40 wt.-% to 60 wt.-% solid material content and subsequent drying.

The grinding of the at least one calcium carbonate-containing mineral filler provided in step (a) is preferably carried out in absence of a dispersing agent.

Depending on the at least one calcium carbonate-containing mineral filler provided in step (a), the total surface moisture content is preferably less than 1.0 wt.-% based on the dry weight of the calcium carbonate-containing mineral filler provided in step (a), even after exposure for 48 hours at 23° C. to a moisture atmosphere having a relative humidity of 50%.

In one preferred embodiment, the at least one calcium carbonate-containing mineral filler provided in step (a) has a total surface moisture content of between 0.01 wt.-% and 1.0 wt.-%, preferably between 0.02 wt.-% and 0.9 wt.-% and more preferably between 0.04 wt.-% and 0.7 wt.-% based on the dry weight of the calcium carbonate-containing mineral filler provided in step (a), even after exposure for 48 hours at 23° C. to a moisture atmosphere having a relative humidity of 50%.

For example, in case a GCC is used as the at least one calcium carbonate-containing mineral filler provided in step (a), the total surface moisture content is preferably of between 0.01 wt.-% and 1.0 wt.-%, more preferably between 0.02 wt.-% and 0.15 wt.-% and most preferably between 0.04 wt.-% and 0.07 wt.-% based on the dry weight of the calcium carbonate-containing mineral filler provided in step (a), even after exposure for 48 hours at 23° C. to a moisture atmosphere having a relative humidity of 50%. In this case, said GCC is for example selected from wet ground and spray dried marble. Preferably, the wet grinding is done at low solids, e.g. at <35 wt % in absence of dispersants.

If a PCC is used as the at least one calcium carbonate-containing mineral filler provided in step (a), the total surface moisture content is preferably of between 0.01 wt.-% and 1.0 wt.-%, more preferably between 0.1 wt.-% and 0.9 wt.-% and most preferably between 0.4 wt.-% and 0.7 wt.-% based on the dry weight of the calcium carbonate-containing mineral filler provided in step (a), even after exposure for 48 hours at 23° C. to a moisture atmosphere having a relative humidity of 50%.

Step (b): Provision of at Least one Aliphatic Aldehyde

According to step (b) of the process of the present invention at least one aliphatic aldehyde having between 6 and 14 carbon atoms is provided.

In this regard, the at least one aliphatic aldehyde represents a surface treatment agent and may be selected from any linear, branched or alicyclic, substituted or non-substituted, saturated or unsaturated aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10.

In another preferred embodiment, the at least one aliphatic aldehyde is preferably chosen such that the number of carbon atoms is between 6 and 12, more preferably between 6 and 9, and most preferably 8 or 9.

The aliphatic aldehyde may be selected from the group of aliphatic aldehydes consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-6-nonenal, (Z)-6-nonenal, (E)-7-nonenal, (Z)-7-nonenal, 8-nonenal, decanal, (E)-2-decenal, (Z)-2-decenal, (E)-3-decenal, (Z)-3-decenal, (E)-4-decenal, (Z)-4-decenal, (E)-5-decenal, (Z)-5-decenal, (E)-6-decenal, (Z)-6-decenal, (E)-7-decenal, (Z)-7-decenal, (E)-8-decenal, (Z)-8-decenal, 9-decenal, undecanal, (E)-2-undecenal, (Z)-2-undecenal, (E)-3-undecenal, (Z)-3-undecenal, (E)-4-undecenal, (Z)-4-undecenal, (E)-5-undecenal, (Z)-5-undecenal, (E)-6-undecenal, (Z)-6-undecenal, (E)-7-undecenal, (Z)-7-undecenal, (E)-8-undecenal, (Z)-8-undecenal, (E)-9-undecenal, (Z)-9-undecenal, 10-undecenal, dodecanal, (E)-2-dodecenal, (Z)-2-dodecenal, (E)-3-dodecenal, (Z)-3-dodecenal, (E)-4-dodecenal, (Z)-4-dodecenal, (E)-5-dodecenal, (Z)-5-dodecenal, (E)-6-dodecenal, (Z)-6-dodecenal, (E)-7-dodecenal, (Z)-7-dodecenal, (E)-8-dodecenal, (Z)-8-dodecenal, (E)-9-dodecenal, (Z)-9-dodecenal, (E)-10-dodecenal, (Z)-10-dodecenal, 11-dodecenal, tridecanal, (E)-2-tridecenal, (Z)-2-tridecenal, (E)-3-tridecenal, (Z)-3-tridecenal, (E)-4-tridecenal, (Z)-4-tridecenal, (E)-5-tridecenal, (Z)-5-tridecenal, (E)-6-tridecenal, (Z)-6-tridecenal, (E)-7-tridecenal, (Z)-7-tridecenal, (E)-8-tridecenal, (Z)-8-tridecenal, (E)-9-tridecenal, (Z)-9-tridecenal, (E)-10-tridecenal, (Z)-10-tridecenal, (E)-11-tridecenal, (Z)-11-tridecenal, 12-tridecenal, butadecanal, (E)-2-butadecenal, (Z)-2-butadecenal, (E)-3-butadecenal, (Z)-3-butadecenal, (E)-4-butadecenal, (Z)-4-butadecenal, (E)-5-butadecenal, (Z)-5-butadecenal, (E)-6-butadecenal, (Z)-6-butadecenal, (E)-7-butadecenal, (Z)-7-butadecenal, (E)-8-butadecenal, (Z)-8-butadecenal, (E)-9-butadecenal, (Z)-9-butadecenal, (E)-10-butadecenal, (Z)-10-butadecenal, (E)-11-butadecenal, (Z)-11-butadecenal, (E)-12-butadecenal, (Z)-12-butadecenal, 13-butadecenal, and mixtures thereof. In a preferred embodiment, the aliphatic aldehyde is selected from the group consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-7-nonenal, (Z)-7-nonenal, 8-nonenal and mixtures thereof.

In another preferred embodiment, the at least one aliphatic aldehyde of step (b) is a saturated aliphatic aldehyde. In this case the aliphatic aldehyde is selected from the group consisting of hexanal, heptanal, octanal, nonanal, decanal, undecanal, dodecanal, tridecanal, butadecanal and mixtures thereof. Preferably, the at least one aliphatic aldehyde of step (b) in the form of a saturated aliphatic aldehyde is selected from the group consisting of hexanal, heptanal, octanal, nonanal, decanal, undecanal, dodecanal and mixtures thereof. For instance, the at least one aliphatic aldehyde of step (b) in the form of a saturated aliphatic aldehyde is selected from octanal, nonanal and mixtures thereof.

If a mixture of two aliphatic aldehydes, e.g. two saturated aliphatic aldehydes such as octanal and nonanal is used according to the present invention, the weight ratio of octanal and nonanal is from 70:30 to 30:70 and more preferably from 60:40 to 40:60. In one especially preferred embodiment of the present invention, the weight ratio of octanal and nonanal is about 1:1.

The at least one aliphatic aldehyde of the present invention is preferably added such that the added amount of said at least one aliphatic aldehyde corresponds to a theoretical total weight of between 0.25 mg/m$^2$ and 5 mg/m$^2$ on the surface of the treated mineral filler product.

In one preferred embodiment, the at least one aliphatic aldehyde of the present invention is preferably added such that the amount of said at least one aliphatic aldehyde corresponds to a theoretical total weight of less than 5 mg, more preferably less than 4.5 mg and most preferably less than 4.0 mg /m$^2$ on the surface of the treated mineral filler product of the at least one calcium carbonate-containing mineral filler provided in step (a).

In another preferred embodiment, the at least one aliphatic aldehyde of the present invention is added in an amount of about 0.1 wt.-% to 1.5 wt.-%, more preferably of about 0.1 wt.-% to 1.0 wt.-%, even more preferably of about 0.2 wt.-% to 0.8 wt.-% and most preferably of about 0.2 wt.-% to 0.6 wt.-%, based on the dry weight of the at least one calcium carbonate-containing mineral filler provided in step (a).

In another aspect of the present invention, the process for preparing a treated mineral filler product providing a volatile onset temperature of at least 220° C. comprises the steps of:
(a) providing at least one calcium carbonate-containing mineral filler;
(b) providing at least one aliphatic aldehyde having between 6 and 14 carbon atoms;
(c) contacting said at least one mineral filler of step (a), in one or more steps, with the at least one aliphatic aldehyde of step (b) such that the added number of molecules of said at least one aliphatic aldehyde corresponds to a theoretical total number of molecules of from $1\times10^{19}$/m$^2$ to $3\times10^{19}$/m$^2$ on the surface of the treated mineral filler product; and
(d) forming a treatment layer comprising said at least one aliphatic aldehyde and/or reaction products of said at least one aliphatic aldehyde on the surface of said at least one mineral filler resulting in a treated mineral filler product.

In one preferred embodiment, the at least one aliphatic aldehyde is preferably added such that the theoretical total number of molecules of said at least one aliphatic aldehyde on the surface of the treated mineral filler product is from $1\times10^{19}$/m$^2$ to $2\times10^{19}$/m$^2$ of the at least one calcium carbonate-containing mineral filler provided in step (a).

Additionally or alternatively, it is to be noted that the at least one aliphatic aldehyde of step (b) of the inventive process is provided as a liquid at room temperature, i.e. said at least one aliphatic aldehyde features an equivalent isolated viscosity of less than 500 mPa·s at 23° C. when measured in a DV III Ultra model Brookfield viscometer equipped with the disc spindle 3 at a rotation speed of 100 rpm and room temperature (23±1° C.).

Step (c): Contacting the Mineral Filler with said at Least one Aliphatic Aldehyde According to step (c) of the inventive process, the at least one calcium carbonate-containing mineral filler of step (a) is contacted, in one or more steps, with the at least one aliphatic aldehyde of step (b) such that the added amount of said at least one aliphatic aldehyde corresponds to a theoretical total weight of between 0.25 mg/m$^2$ and 5 mg/m$^2$ on the surface of the treated mineral filler product.

Step (c) of contacting the at least one calcium carbonate-containing mineral filler with the at least one aliphatic aldehyde preferably takes place under mixing conditions. The skilled man will adapt these mixing conditions (such as the configuration of mixing pallets and mixing speed) according to his process equipment.

In one preferred embodiment, the inventive process may be a continuous process. In this case, it is possible to contact the at least one calcium carbonate-containing mineral filler with the at least one aliphatic aldehyde in a constant flow, so that a constant concentration of the aldehyde is provided during step (c). In another preferred embodiment, the inventive process may be a batch process, i.e. the at least one calcium carbonate-containing mineral filler is contacted with the at least one aliphatic aldehyde in more than one steps, wherein said aliphatic aldehyde is preferably added in about equal portions. Alternatively, it is also possible to add the aliphatic aldehyde in unequal portions to the at least one calcium carbonate-containing mineral filler, i.e. in larger and smaller portions.

When implementing the at least one aliphatic aldehyde provided in step (c), it features a workable viscosity at about room temperature, i.e. the at least one aliphatic aldehyde is in a liquid state. Therefore, the contacting of the at least one calcium carbonate-containing mineral filler with the at least one aliphatic aldehyde may be carried out at lower treatment temperatures than that used in processes implementing carboxylic acids and/or carboxylic acid salts having e.g. more than 10 carbon atoms. In a preferred embodiment, the contacting of the at least one calcium carbonate-containing mineral filler with the at least one aliphatic aldehyde is carried out at treatment temperatures of below 120° C. and most preferably of below 110° C. In another preferred embodiment, the contacting of the at least one mineral filler with the at least one aliphatic aldehyde is carried out at temperatures of between 15 and 150° C., more preferably of between 15 and 110° C., e.g. of about 80° C. or 100° C.

The treatment time for carrying out the contacting of the at least one calcium carbonate-containing mineral filler with the at least one aliphatic aldehyde is carried out for a period of 30 min or less, preferably for a period of 20 min or less and more preferably for a period of 15 min or less. In general, the length of contacting the at least one calcium carbonate-containing mineral filler with the at least one aliphatic aldehyde is determined by the treatment temperature applied during step (c). For example, where a treatment temperature of about 100° C. is applied, the treatment time is as short as, for example, about 5 or 10 minutes. If a treatment temperature of about 80° C. is applied, the treatment time can be as long as, for example, about 10 or 15 minutes. In case the inventive process is implemented as a continuous process, the treatment time is preferably less than 60 sec, more preferably less than 10 sec and most preferably less than 5 sec.

In a preferred embodiment, the contacting of step (c) may further comprise contacting said at least one calcium carbonate-containing mineral filler of step (a) with at least one saturated aliphatic carboxylic acid having 6 to 28 carbon atoms and/or at least one cation salt of one or more saturated aliphatic carboxylic acids having 6 to 28 carbon atoms.

Such contacting of the at least one calcium carbonate-containing mineral filler with at least one saturated aliphatic carboxylic acid and/or at least one cation salt of one or more saturated aliphatic carboxylic acids may be carried out during and/or after the contacting of the mineral filler with the at least one aliphatic aldehyde. If the contacting of the at least one calcium carbonate-containing mineral filler with at least one saturated aliphatic carboxylic acid and/or at least one cation salt of one or more saturated aliphatic carboxylic acids is carried out simultaneously to the addition of the at least one aliphatic aldehyde of step (b), the contacting is preferably carried out at temperatures of between 60° C. and 150° C., for example, of between 80° C. and 120° C. In this case, the length of the contacting of the at least one calcium carbonate-containing mineral filler with the at least one aliphatic aldehyde and the at least one saturated aliphatic carboxylic acid and/or the at least one cation salt of one or more saturated aliphatic carboxylic acids is determined by the treatment temperature applied during said contacting. For example, where a treatment temperature of about 100° C. is applied, the treatment time is as short as, for example, about 10 minutes.

In case, the contacting of the at least one calcium carbonate-containing mineral filler with the at least one saturated aliphatic carboxylic acid and/or at least one cation salt of one or more saturated aliphatic carboxylic acids is carried out simultaneously to the addition of the at least one aliphatic aldehyde of step (b), the at least one saturated aliphatic carboxylic acid and/or at least one cation salt of one or more saturated aliphatic carboxylic acids and the at least one aliphatic aldehyde are preferably provided in a blend of the at least one saturated aliphatic carboxylic acid and/or the at least one cation salt of one or more saturated aliphatic carboxylic acids dissolved in the at least one aliphatic aldehyde. Therefore, when implementing such blend, it features a workable viscosity at about room temperature, i.e. the blend is in a liquid state.

In a preferred embodiment, said at least one saturated aliphatic carboxylic acid is chosen from aliphatic monocarboxylic acids. Alternatively or additionally, they may be linear aliphatic carboxylic acids and/or hydroxylated (i.e. OH group-comprising) aliphatic carboxylic acids.

In this regard, the at least one saturated aliphatic carboxylic acid is preferably chosen such that the number of carbon atoms is lower or equal to 28, preferably lower or equal to 24, more preferably lower or equal to 22, more preferably lower or equal to 20 and most preferably lower or equal to 18. Furthermore, said carboxylic acid has generally a number of carbon atoms that is greater than or equal to 6, preferably greater than or equal to 10, more preferably greater than or equal to 12 and most preferably greater than or equal to 14. In one preferred embodiment, the number of carbon atoms of the at least one saturated aliphatic carboxylic acid is between 6 and 28, preferably between 10 and 24, more preferably between 12 and 22, even more preferably between 12 and 20 and most preferably between 14 and 18.

For example, the at least one saturated aliphatic carboxylic acid is selected from the group consisting of stearic acid, behenic acid, palmitic acid, isostearic acid, montanic acid, capric acid, lauric acid, myristic acid and mixtures thereof. In one preferred embodiment, the at least one saturated aliphatic carboxylic acid is selected from stearic acid and/or palmitic acid and/or myristic acid and/or lauric acid or mixtures thereof, and most preferably is stearic acid and/or palmitic acid.

If a mixture of two saturated aliphatic carboxylic acids, e.g. stearic acid and palmitic acid is used according to the present invention, the weight ratio of stearic acid and palmitic acid is from 3:1 to 1:3 and more preferably from 2:1 to 1:2. In one especially preferred embodiment of the present invention, the weight ratio of stearic acid and palmitic acid is about 1:1.

In case, the contacting of step (c) comprises contacting said at least one calcium carbonate-containing mineral filler of step (a) with at least one cation salt of one or more saturated aliphatic carboxylic acids having 6 to 28 carbon atoms, the cation of the salt is preferably selected from the second main group of the periodic system, such as calcium, magnesium and/or strontium. For example, the cation of said salt is selected from calcium and/or magnesium.

Furthermore, it is preferred that the equivalent isolated mixture of the at least one saturated aliphatic carboxylic acid and/or at least one cation salt of one or more saturated aliphatic carboxylic acids features a viscosity of less than 10000, preferably of less than 1000, and more preferably of less than 500 mPa·s at 180° C.

The at least one saturated aliphatic carboxylic acid and/or the at least one cation salt of one or more saturated aliphatic carboxylic acids of the present invention are preferably added in a quantity such that the added amount of said at least one saturated aliphatic carboxylic acid and/or the at least one cation salt of one or more saturated aliphatic carboxylic acids and/or the at least one aliphatic aldehyde corresponds to a theoretical total weight of between 0.25 mg/m$^2$ to 5 mg/m$^2$ on the surface of the treated mineral filler product.

In one preferred embodiment, the at least one aliphatic aldehyde of the present invention is preferably added in a quantity such that the added amount of said at least one saturated aliphatic carboxylic acid and/or the at least one cation salt of one or more saturated aliphatic carboxylic acids and/or the at least one aliphatic aldehyde corresponds to a theoretical total weight of less than 5 mg, more preferably less than 4.5 mg and most preferably less than 4 mg/m$^2$ on the surface of the treated mineral filler product.

In another preferred embodiment, the at least one saturated aliphatic carboxylic acid and/or the at least one cation salt of one or more saturated aliphatic carboxylic acids of the present invention is added in an amount of about 0.1 wt.-% to 1.5 wt.-%, more preferably in the range of about 0.1 wt.-% to 1.0 wt.-%, even more preferably in the range of about 0.2 wt.-% to 0.8 wt.-% and most preferably in the range of about 0.2 wt.-% to 0.6 wt.-%, based on the dry weight of the at least one calcium carbonate-containing mineral filler provided in step (a).

Additionally or alternatively, it is also possible that additional treatment agents that do not correspond to the at least one aliphatic aldehyde, nor to the at least one saturated aliphatic carboxylic acid and/or at least one cation salt of one or more saturated aliphatic carboxylic acids are implemented in the process of the present invention. In such a case, it is preferred that this additional treatment agent is at least one polysiloxane, and more preferably a polydimethylsiloxane (PDMS).

The at least one polysiloxane is preferably added such that the amount of the at least one polysiloxane on the surface of the treated mineral filler product corresponds to a theoretical total weight of less than 0.1 mg/m$^2$, more preferably less than 0.075 mg/m$^2$ and most preferably less than 0.05 mg/m$^2$.

In this regard, it is to be noted that such contacting of the at least one calcium carbonate-containing mineral filler with the at least one polysiloxane may be carried out during or after the contacting of the at least one calcium carbonate-containing mineral filler with the at least one aliphatic aldehyde. In one preferred embodiment, such contacting with the at least one polysiloxane is carried out after the contacting of the at least one calcium carbonate-containing mineral filler with the at least one aliphatic aldehyde. In this case, the contacting is preferably carried out at temperatures of between 90° C. and 110° C., for example, of about 100° C. The length of contacting the at least one calcium carbonate-containing mineral filler with the at least one polysiloxane is determined by the treatment temperature applied during said contacting. For example, where a treatment temperature of about 100° C. is applied, the treatment time is as short as, for example, about 5 minutes.

In a preferred embodiment, the contacting of the at least one calcium carbonate-containing mineral filler with the at least one polysiloxane is carried out after the simultaneous addition of the at least one aliphatic aldehyde of step (b) and the at least one saturated aliphatic carboxylic acid and/or at least one cation salt of one or more saturated aliphatic carboxylic acids.

Step (d): Forming of a Treatment Layer

According to step (d) of the process of the present invention, a treatment layer comprising said at least one aliphatic aldehyde and/or reaction products of said at least one aliphatic aldehyde is formed on the surface of said at least one calcium carbonate-containing mineral filler resulting in a treated mineral filler product.

Step (d) of forming of the treatment layer comprising said at least one aliphatic aldehyde and/or reaction products of said at least one aliphatic aldehyde on the surface of said at least one calcium carbonate-containing mineral filler preferably takes place under an atmosphere of air (23 vol.-% O$_2$/78 vol.-% N$_2$).

Furthermore, the treatment layer is characterized in that the added amount of said at least one aliphatic aldehyde corresponds to a theoretical total weight of between 0.25 to 5 mg/m$^2$ on the surface of the treated mineral filler product.

In one preferred embodiment, the treatment layer is characterized in that the added amount of said at least one aliphatic aldehyde corresponds to a theoretical total weight of less than 5 mg, more preferably less than 4.5 mg and most preferably less than 4.0 mg/m$^2$ on the surface of the treated mineral filler product.

It is further to be noted that the treatment layer of the treated mineral filler product may comprise the at least one aliphatic aldehyde and/or further surface treatment agents such as the at least one saturated aliphatic carboxylic acid and/or at least one cation salt of one or more saturated aliphatic carboxylic acids in the form of reaction products obtained by contacting the mineral filler with the respective surface treatment agent.

The resulting treated mineral filler products obtained according to the present invention have improved surface characteristics in comparison to mineral fillers treated with carboxylic acids and/or carboxylic acid salts having at least 10 carbon atoms, i.e. without the implementation of the at least one aliphatic aldehyde. The resulting treated mineral filler products obtained from the inventive process provide a volatile onset temperature that is higher than that obtained for mineral fillers treated with carboxylic acids and/or carboxylic acid salts having at least 10 carbon atoms. Additionally, the treated mineral filler products obtained from the inventive process provide a moisture pick up susceptibility that is lower than that obtained for mineral fillers treated with carboxylic acids and/or carboxylic acid salts having at least 10 carbon atoms. Furthermore, the resulting treated mineral filler products obtained from the inventive process provide a sufficient hydrophobicity for plastic applications. Said volatile onset temperature and other surface characteristics relating to the present invention are determined in accordance with the measurement method defined above and shown in the example section here below.

In a preferred embodiment of the inventive process, the treated mineral filler product obtained in step (d) features a volatile onset temperature of greater than or equal to 220° C., and preferably of between 230° C. and 300° C. Moreover, the obtained treated mineral filler product has preferably a higher volatile onset temperature than the same mineral filler having a treatment layer but wherein the at least one aliphatic aldehyde is replaced with carboxylic acids and/or carboxylic acid salts having at least 10 carbon atoms.

Furthermore, the treated mineral filler products obtained from the inventive process provide a low moisture pick up susceptibility. It is preferred that the moisture pick up susceptibility of the treated mineral filler product obtained in step (d) is such that its total surface moisture level is below 1.0 mg/g, more preferably below 0.5 mg/g and most preferably below 0.4 mg/g of the dry treated mineral filler product, after exposure to an atmosphere of 50% of relative humidity for 48 hours at a temperature of 23° C. In another preferred embodiment, the moisture pick up susceptibility of the treated mineral filler product obtained in step (d) is such that its total surface moisture level is less than 0.35 mg/g, more preferably less than 0.3 mg/g and most preferably less than 0.25 mg/g of the dry treated mineral filler product, after exposure to an atmosphere of 50% of relative humidity for 48 hours at a temperature of 23° C. In still another preferred embodiment, the treated mineral filler product obtained in step (d) has a moisture content of between 0.01 wt.-% and 0.15 wt.-%, preferably between 0.02 wt.-% and 0.12 wt.-% and more preferably between 0.04 wt.-% and 0.08 wt.-% based on the dry weight of the at least one mineral filler of step (d).

The treated mineral filler product thus obtained may advantageously be implemented in a process of mixing and/or extruding and/or compounding and/or blow moulding with plastic materials, and preferably with PVC, polyolefins, such as polyethylene (PE), polypropylene (PP) and/or polyurethanes (PU), particularly to obtain film materials, namely stretched / oriented film materials, and preferably breathable film materials, or extrusion coating film materials.

In particular, film materials selected from the group comprising stretched and/or oriented films, and preferably breathable films, or extrusion coating films are characterised in that they contain said treated mineral filler product obtainable by the process of the present invention.

In this regard, films according to the invention are characterized in that they contain treated mineral filler products obtainable by the process of the present invention and in that they have less voids leading to uneven surfaces and improved visible uniformity.

As another advantage, the mineral filler product obtained by the process of the present invention causes a higher output rate.

The following examples may additionally illustrate the invention but are not meant to restrict the invention to the exemplified embodiments. The examples below show the high volatile onset temperature and the reduced moisture pick up susceptibility of the treated mineral filler according to the present invention:

EXAMPLES

All measurement methods implemented in the examples are described hereabove.

Example 1

Comparative Example

Example 1 refers to the treatment of a wet ground and spray dried marble with a 1:1 mixture of stearic acid and palmitic acid at a treatment temperature of about 130° C. and the subsequent treatment with polydimethylsiloxane.

500 g of a dry ground, followed by wet ground and spray dried marble from Carrara, Italy, wet ground at 25 wt.-% in tap water in a horizontal ball mill (Dynomill 1.4 litre volume) and spray dried, featuring a $d_{50}$ of approximately 1.6 microns, a specific surface area of 4.1 $m^2/g$ and a humidity of 0.06 wt.-% was added to an MTI Mixer and the mixing was activated at 3000 rpm. Thereafter a 1:1 mixture (by weight) of dry stearic acid powder and dry palmitic acid powder at room temperature was introduced to the mixer in a quantity so as to obtain the mg of treatment agent per $m^2$ of marble indicated in Table 1, and the mixer contents were heated to 130° C. The contents of the mixer were mixed at 130° C. under a stirring speed of 3000 rpm for a period of 10 minutes. Thereafter polydimethylsiloxane (Dow Corning 200 Fluid 1000 CS) was introduced to the mixer in a quantity so as to obtain the mg of treatment agent per $m^2$ of marble indicated in Table 1. The contents of the mixer were mixed at 100° C. under a stirring speed of 3000 rpm for a second period of 5 minutes.

The product thus obtained was thereafter analysed; the results are presented in Table 1.

Example 2

Example of the Invention

Example 2 refers to the treatment of a wet ground and spray dried marble with heptanal at a treatment temperature of about 80° C.

500 g of a wet ground and spray dried marble from Carrara, Italy, wet ground at 25 wt.-% in tap water in a horizontal ball mill (Dynomill) and spray dried featuring a $d_{50}$ of approximately 1.6 microns, a specific surface area of 4.1 $m^2/g$ and a humidity of 0.06 wt.-% was added to an MTI Mixer and the mixing was activated at 3000 rpm. Thereafter heptanal (Aldrich W254002) was introduced to the mixer in a quantity so as to obtain the mg of treatment agent per $m^2$ of marble indicated in Table 1, and the mixer contents were heated to 80° C. The contents of the mixer were mixed at 80° C. under a stirring speed of 3000 rpm for a period of 10 minutes.

The product thus obtained was thereafter analysed; the results are presented in Table 1.

Example 3

Example of the Invention

Example 3 refers to the treatment of a wet ground and spray dried marble with octanal at a treatment temperature of about 80° C.

500 g of a dry ground, followed by wet ground and spray dried marble from Carrara, Italy, wet ground at 25 wt.-% in tap water in a horizontal ball mill (Dynomill) and spray dried featuring a $d_{50}$ of approximately 1.6 microns, a specific surface area of 4.1 $m^2/g$ and a humidity of 0.05 wt.-% was added to an MTI Mixer and the mixing was activated at 3000 rpm. Thereafter octanal (Aldrich W279714) was introduced to the mixer in a quantity so as to obtain the mg of treatment agent per $m^2$ of marble indicated in Table 1, and the mixer contents were heated to 80° C. The contents of the mixer were mixed at 80° C. under a stirring speed of 3000 rpm for a period of 10 minutes.

The product thus obtained was thereafter analysed; the results are presented in Table 1.

Example 4

Example of the Invention

Example 4 refers to the treatment of a wet ground and spray dried marble with undecanal at a treatment temperature of about 80° C.

500 g of a dry ground, followed by wet ground and spray dried marble from Carrara, Italy, wet ground at 25 wt.-% in tap water in a horizontal ball mill (Dynomill) and spray dried featuring a $d_{50}$ of approximately 1.6 microns, a specific surface area of 4.1 $m^2/g$ and a humidity of 0.05 wt.-% was added to an MTI Mixer and the mixing was activated at 3000 rpm. Thereafter undecanal (Aldrich U2202) was introduced to the mixer in a quantity so as to obtain the mg of treatment agent per $m^2$ of marble indicated in Table 1, and the mixer contents were heated to 80° C. The contents of the mixer were mixed at 80° C. under a stirring speed of 3000 rpm for a period of 10 minutes.

The product thus obtained was thereafter analysed; the results are presented in Table 1.

Example 5

Example of the Invention

Example 5 refers to the treatment of a wet ground and spray dried marble with dodecanal at a treatment temperature of about 80° C.

500 g of a dry ground, followed by wet ground and and spray dried marble from Carrara, Italy, wet ground at 25 wt.-% in tap water in horizontal ball mill (Dynomill) and spray dried featuring a $d_{50}$ of approximately 1.6 microns, a specific surface area of 4.1 $m^2/g$ and a humidity of 0.05 wt.-% was added to an MTI Mixer and the mixing was activated at 3000 rpm. Thereafter dodecanal (Aldrich D222003) was introduced to the mixer in a quantity so as to obtain the mg of treatment agent per m² of marble indicated in Table 1, and the mixer contents were heated to 80° C. The contents of the mixer were mixed at 80° C. under a stirring speed of 3000 rpm for a period of 5 minutes.

The product thus obtained was thereafter analysed; the results are presented in Table 1.

TABLE 1

| | Test | | | | |
|---|---|---|---|---|---|
| | 1 Comparative | 2 Invention | 3 Invention | 4 Invention | 5 Invention |
| Mineral | CaCO3 (GCC) | CaCO3 (GCC) | CaCO3 (GCC) | CaCO3 (GCC) | CaCO3 (GCC) |
| Treatment agents | | | | | |
| 1. carboxylic acid | C16/C18 acids | | | | |
| 2. aliphatic aldehyde | | heptanal | octanal | undecanal | dodecanal |
| 3. further additive | 500 ppm polydimethyl siloxane | | | | |
| Total of treatment 1 and 2 | 2.4 mg/m² of mineral | 3.4 mg/m² of mineral | 3.4 mg/m² of mineral | 3.7 mg/m² of mineral | 3.4 mg/m² of mineral |
| Number of molecules of treatment agent 1 and 2 | $5.3 \times 10^{18}$/m² of mineral | $1.8 \times 10^{19}$/m² of mineral | $1.6 \times 10^{19}$/m² of mineral | $1.3 \times 10^{19}$/m² of mineral | $1.1 \times 10^{19}$/m² of mineral |
| Treatment Temp. (° C.) | 130° C. | 80° C. | 80° C. | 80° C. | 80° C. |
| Treatment Time (min.) | 10/5 | 10 | 10 | 10 | 5 |
| Moisture content in ppm | 700 | 750 | 710 | 640 | 600 |
| Treatment agent at 20° C. | Solid | Liquid | Liquid | Liquid | Liquid |
| Brookfield visc. of carboxylic acid/aliphatic aldehyde | Not measurable | <500 mPa·s | <500 mPa·s | <500 mPa·s | <500 mPa·s |
| Volatile onset temperature | 244° C. | 230° C. | 233° C. | 221° C. | 244° C. |
| Water pick up (mg/g) 23° C., 50% rel. Humidity exposure time 48 hours | 0.33 | 0.27 | 0.21 | 0.32 | 0.27 |
| Hydrophobic in H₂O/methanol (v/v) | 40/60 | 40/60 | 40/60 | 40/60 | 40/60 |

What is claimed is:

1. A process for preparing a treated mineral filler product providing a volatile onset temperature of at least 220° C., the process comprises the steps of:
   (a) providing at least one calcium carbonate-containing mineral filler;
   (b) providing at least one aliphatic aldehyde having between 6 and 14 carbon atoms;
   (c) contacting the at least one mineral filler of step (a), in one or more steps, with the at least one aliphatic aldehyde of step (b) such that the added amount of the at least one aliphatic aldehyde corresponds to a theoretical total weight of between 0.25 mg/m² and 5 mg/m² on the surface of the treated mineral filler product; and
   (d) forming a treatment layer comprising the at least one aliphatic aldehyde and/or reaction products of the at least one aliphatic aldehyde on the surface of the at least one calcium carbonate-containing mineral filler of step (a) resulting in a treated mineral filler product providing a volatile onset temperature of at least 220° C.

2. The process according to claim 1, wherein the at least one calcium carbonate-containing mineral filler of step (a) is precipitated calcium carbonate (PCC) and/or natural ground calcium carbonate (GCC).

3. The process according to claim 1, wherein the at least one calcium carbonate-containing mineral filler of step (a) is precipitated calcium carbonate (PCC) in one or more of aragonitic, vateritic and calcitic mineralogical crystal forms.

4. The process according to claim 1, wherein the at least one calcium carbonate-containing mineral filler of step (a) is natural ground calcium carbonate (GCC) comprising ground marble, limestone, chalk, and/or dolomite.

5. The process according to claim 1, wherein the at least one aliphatic aldehyde of step (b) is an aliphatic aldehyde having 6 to 12 carbon atoms.

6. The process according to claim 1, wherein the at least one aliphatic aldehyde of step (b) is an aliphatic aldehyde having 6 to 9 carbon atoms.

7. The process according to claim 1, wherein the at least one aliphatic aldehyde of step (b) is an aliphatic aldehyde having 8 or 9 carbon atoms.

8. The process according to claim 1, wherein the at least one aliphatic aldehyde of step (b) is a saturated aliphatic aldehyde.

9. The process according to claim 1, wherein the at least one aliphatic aldehyde of step (b) features an equivalent isolated viscosity of less than 500 mP·s at 23° C.

10. The process according to claim 1, wherein the at least one mineral filler provided in step (a) has a median particle size diameter $d_{50}$ in the range between 0.3 µm and 10 µm.

11. The process according to claim 1, wherein the at least one mineral filler provided in step (a) has a specific surface area (BET) of between 1 m²/g and 10 m²/g as measured by the BET nitrogen method.

12. The process according to claim 1, wherein the at least one mineral filler provided in step (a) has a specific surface area (BET) of between 3 m²/g and 8 m²/g as measured by the BET nitrogen method.

13. The process according to claim 1, wherein the at least one mineral filler of step (a) has a moisture content of between 0.01 wt.-% and 1.0 wt.-%, based on the dry weight of the at least one mineral filler provided in step (a).

14. The process according to claim 1, wherein step (c) further comprises contacting the at least one mineral filler of step (a) with at least one saturated aliphatic carboxylic acid having 6 to 28 carbon atoms and/or at least one cation salt of one or more saturated aliphatic carboxylic acids having 6 to 28 carbon atoms.

15. The process according to claim 1, wherein step (c) further comprises contacting the at least one mineral filler of step (a) with a saturated aliphatic carboxylic acid selected from the group consisting of stearic acid, behenic acid, palmitic acid, isostearic acid, montanic acid, capric acid, lauric acid, myristic acid, and any mixtures thereof.

16. The process according to claim 1, wherein step (c) further comprises contacting the at least one mineral filler of step (a) with a 2:1 to 1:2 mixture (by weight) of stearic acid and palmitic acid.

17. The process according to claim 1, wherein step (c) further comprises contacting the at least one mineral filler of step (a) with at least one polysiloxane.

18. The process according to claim 1, wherein step (c) further comprises contacting the at least one mineral filler of step (a) with polydimethylsiloxane.

19. The process according to claim 1, wherein the treated mineral filler product obtained in step (d) has a volatile onset temperature of greater than or equal to 220° C.

20. The process according to claim 1, wherein the treated mineral filler product obtained in step (d) has a volatile onset temperature of between 230° C. and 300° C.

21. The process according to claim 1, wherein the treated mineral filler product obtained in step (d) has a moisture content of between 0.01 wt.-% and 0.15 wt.-%, based on the dry weight of the at least one mineral filler of step (d).

22. The process according to claim 1, wherein the treated mineral filler product obtained in step (d) has a moisture content of between 0.02 wt.-% and 0.12 wt.-%, based on the dry weight of the at least one mineral filler of step (d).

23. The process according to claim 1, wherein the treated mineral filler product obtained in step (d) has a moisture content of between 0.04 wt.-% and 0.08 wt.-%, based on the dry weight of the at least one mineral filler of step (d).

24. The process according to claim 1, wherein the treated mineral filler product obtained in step (d) features a moisture pick up susceptibility such that its total surface moisture level is below 1.0 mg/g, of the dry treated mineral filler product after exposure to an atmosphere of 50% of relative humidity for 48 hours at a temperature of 23° C.

25. The process according to claim 1, wherein the treated mineral filler product obtained in step (d) features a moisture pick up susceptibility such that its total surface moisture level is below 0.5 mg/g, of the dry treated mineral filler product after exposure to an atmosphere of 50% of relative humidity for 48 hours at a temperature of 23° C.

26. The process according to claim 1, wherein the treated mineral filler product obtained in step (d) features a moisture pick up susceptibility such that its total surface moisture level is below 0.4 mg/g, of the dry treated mineral filler product after exposure to an atmosphere of 50% of relative humidity for 48 hours at a temperature of 23° C.

27. The process according to claim 1, wherein the at least one aliphatic aldehyde having between 6 and 14 carbon atoms is heptanal.

28. The process according to claim 1, wherein the at least one aliphatic aldehyde having between 6 and 14 carbon atoms is octanal.

29. The process according to claim 1, wherein the at least one aliphatic aldehyde having between 6 and 14 carbon atoms is undecanal.

30. The process according to claim 1, wherein the at least one aliphatic aldehyde having between 6 and 14 carbon atoms is dodecanal.

* * * * *